US005380871A

United States Patent [19]

Kohlhaupt et al.

[11] Patent Number: 5,380,871

[45] Date of Patent: Jan. 10, 1995

[54] PREPARATION OF HALOGENATED INDIGO

[75] Inventors: Reinhold Kohlhaupt, Frankenthal; Udo Bergmann, Bensheim; Lothar Haas, Dannstadt-Schauernheim, all of Germany

[73] Assignee: BASF Aktiengesellschaft, Ludwigshafen, Germany

[21] Appl. No.: 117,075

[22] PCT Filed: Mar. 19, 1992

[86] PCT No.: PCT/EP92/00612

§ 371 Date: Sep. 14, 1993

§ 102(e) Date: Sep. 14, 1993

[87] PCT Pub. No.: WO92/17547

PCT Pub. Date: Oct. 15, 1992

[30] Foreign Application Priority Data

Mar. 30, 1991 [DE] Germany ............................ 4110458

[51] Int. Cl.[6] ............................................ C07D 405/04

[52] U.S. Cl. ..................................... 548/459; 548/458

[58] Field of Search .......................................... 548/459

[56] References Cited

U.S. PATENT DOCUMENTS

| | | | |
|---|---|---|---|
| 2,862,930 | 12/1958 | Caliezi et al. | 548/459 |
| 3,530,151 | 9/1970 | Hoare | 548/459 |

FOREIGN PATENT DOCUMENTS

| | | |
|---|---|---|
| 208471 | 3/1909 | Germany . |
| 226319 | 9/1910 | Germany . |
| 229304 | 12/1910 | Germany . |
| 237262 | 8/1911 | Germany . |
| 239314 | 10/1911 | Germany . |
| 441253 | 1/1968 | Switzerland . |

*Primary Examiner*—David B. Springer
*Attorney, Agent, or Firm*—Oblon, Spivak, McClelland, Maier, & Neustadt

[57] ABSTRACT

A process for preparing halogenated indigo by reacting indigo with bromine and/or chlorine in the presence or absence of iodine as catalyst comprises using thionyl chloride as reaction medium.

13 Claims, No Drawings

PREPARATION OF HALOGENATED INDIGO

Of the multiplicity of halogen compounds of indigo described in the literature, only 5,7,5',7'-tetrabromoindigo finds industrial utility (Vat Blue 5, C.I. 73065). Vat Blue 5 is an important dye for dyeing and printing textiles in brilliant blues.

In industry this dye is synthesized by brominating indigo in glacial acetic acid as reaction medium (Ullmann's Encyclopedia of Industrial Chemistry, fifth edition: Vol. A 14, p. 155; Indigo and Indigo Colorants) in the presence of a hydrogen halide acceptor salt, e.g. sodium acetate (DR-C-237 262). It is also known to brominate indigo in nitrobenzene (DR-C-193 438) and in di- or trichlorobenzene (DR-C-208 471).

The halogenation of indigo in toxic solvents such as nitrobenzene or chlorobenzene is problematical with regard to occupational hygiene, clean air and clean water.

Unless the industrially practiced process involving glacial acetic acid as reaction medium is carried out with an uneconomical regeneration of the glacial acetic acid, the production of 1 kg of Vat Blue 5 tips about 5 kg of organically bound carbon into the waste water, so that considerable water treatment costs become unavoidable.

It is an object of the present invention to provide a process for preparing Vat Blue 5 that is free of the disadvantages of existing processes.

German Patents 226,319, 239,314 and in particular 229,304 likewise disclose processes for preparing indigo-halogen compounds. The nearest art is the disclosure in DE-C-229 304 of the reaction of indigo with bromine in sulfuryl chloride, which, however, does not give uniform indigo derivatives and, what is more, leads to the formation of by-products.

We have found, surprisingly, that halogenated indigo can be prepared in high yield and quality in an economically and ecologically advantageous manner by reacting indigo with bromine and/or chlorine in thionyl chloride as reaction medium.

As in the literature, only about half the theoretical amount of bromine is used for preparing tetrabromoindigo, since the resulting hydrogen bromide is converted back into bromine by passing chlorine into the reaction mixture. Excess chlorine eventually oxidizes the brominated indigo to its yellow dehydro form.

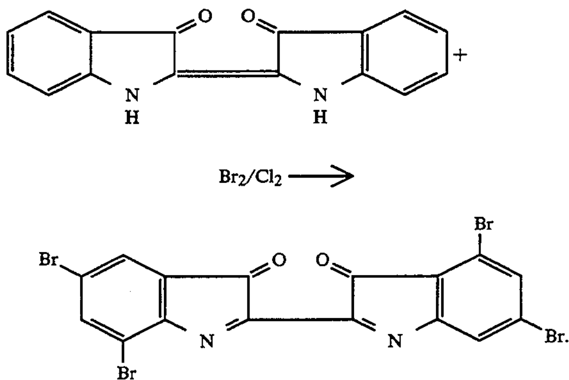

The dehydrotetrabromoindigo is finally reduced with a reducing agent, e.g. sodium thiosulfate, to tetrabromoindigo.

Depending on the reactor type employed, it has been found to be advantageous to introduce indigo into thionyl chloride in a weight ratio of from 1:1 to 1:10, preferably from 1:3 to 1:7, and to react it at from 0° to 75° C., preferably at from 20° to 40° C., with bromine in a molar ratio of from 1:0.5 to 1:3.0, preferably from 1:2.2 to 1:2.6, over 1–4 hours, preferably over 1.5–2.5 hours. The subsequent introduction of chlorine in a molar ratio of from 1:1.5 to 1:8, preferably from 1:5.5 to 1:7, at 0°–75° C., preferably at 20°–40° C., over 8–16 hours, preferably over 11–13 hours, in the presence or absence of iodine as catalyst gives the dehydroform of Vat Blue 5. The reaction mixture can then be introduced into water and the dehydroindigo reduced to Vat Blue 5 in a known manner. The bromine content of the resulting dye, which is of high quality in coloristic and fastness properties, is 50.5–53.5% coupled with a chlorine content of 0.5–2.5%.

If the halogenation is carried out in thionyl chloride using chlorine only in an indigo to chlorine molar ratio of from 1:5 to 1:10, preferably 1:8, then reduction of the dehydrotetrachloroindigo intermediate gives 5,7,5',7'-tetrachloroindigo with a chlorine content of 33.0–35.5%.

If indigo is reacted in thionyl chloride with less bromine than required for preparing Vat Blue 5, for example in a molar ratio of 1:1, then further reaction with chlorine and reduction of the dehydrotetrahaloindigo intermediate will give 5,5'-dibromo-7,7'-dichloroindigo.

It is particularly advantageous to halogenate indigo in thionyl chloride in a paddle dryer or in a rotating tube reactor made of a special steel, since in that case the thionyl chloride used for the synthesis can be readily distilled out of the reaction mixture once the dehydrohaloindigo has been formed and can be reused for halogenating indigo.

Embodiments of the invention will now be more particularly described by way of example.

EXAMPLE 1

In a 500-ml stirred reactor 50 g of indigo powder (calculated as 100% pure) are stirred into 250 g of thionyl chloride at 20°–30° C. in the course of about 10 minutes. After continued stirring for 10 minutes 73 g of bromine are added with gentle cooling at the same temperature in the course of 15 minutes, which is followed by a further hour of stirring at 20°–30° C. Then 81 g of chlorine are introduced at the same temperature in the course of 8 hours. After continued stirring for 1 hour the reaction batch is introduced in a 4-l stirred reactor into a mixture of 1 kg of water and 0.5 kg of ice. The suspension obtained is subsequently stirred for 1 hour, and then the dehydrotetrabromoindigo is filtered off with suction and washed neutral with water at about 20° C.

The moist filter cake is then stirred in a 3-l reactor into 1.5 kg of water, adjusted to pH 7–7.5 with about 3 g of NaOH (50%) and admixed over 15 minutes of stirring with 87 g of sodium thiosulfate ($Na_2S_2O_3 \times 5H_2O$). This is followed by heating to 90°–95° C. over 30 minutes and stirring is continued at that temperature for 2 hours during which the pH is kept at a constant 7.0–7.5 by the addition of 37 g of NaOH (50%). After a further 22 g of NaOH (50%) have been stirred in and the reaction mixture has been stirred at 90°–95° C. for a further 30 minutes, it is cooled down to 70° C. and filtered with suction. The filter cake is washed neutral with water and dried. The product obtained is 101 g of Vat Blue 5 containing 52.3% of bromine and 0.5% of chlorine, corresponding to a yield of 91.5% of theory (calculated for tetrabromoindigo).

EXAMPLE 2

In a 500 ml stirred reactor 50 g of indigo powder (calculated as 100% pure) are stirred into 250 g of thionyl chloride. 73 g of bromine are added dropwise to the suspension at 20°-30° C. in the course of 15 minutes. After continued stirring at that temperature for 1 hour 81 g of chlorine are passed into the reaction mixture at 20°-30° C. over 6 hours. After further stirring at constant temperature for 1 hour the thionyl chloride is distilled out of the synthesis mixture, for example in a rotary evaporator, 220 g being recovered. The remaining solid distillation residue is admixed with 1500 g of water and reduced to tetrabromoindigo with 87 g of sodium thiosulfate ($Na_2S_2O_3 \times 5H_2O$) as described in Example 1. The product obtained is 102.1 g of Vat Blue 5 containing 52.8% of bromine and 1.2% of chlorine, corresponding to a yield of 92.1% of theory (calculated for tetrabromoindigo).

EXAMPLE 3

In a 500-ml stirred reactor 50 g of indigo powder (calculated as 100% pure) are stirred into 300 g of thionyl chloride. The suspension obtained is admixed at 20°-30° C. with 73 g of bromine in the course of 15 minutes. After continued stirring at that temperature for 1 hour the mixture is heated to 50° C., 1.5 g of iodine are added, and 90 g of chlorine gas are introduced at the same temperature in the course of 6 hours. The reaction mixture is stirred at 50° C. for a further hour and then introduced into a mixture of 1 kg of water and 0.5 kg of ice. After continued stirring for 1 hour the suspended dehydrotetrabromoindigo is filtered off and washed neutral with water on a suction filter. The filter cake is reduced with 87 g of sodium thiosulfate to tetrabromoindigo as described in Example 1. The workup gave 105.1 g of Vat Blue 5 containing 52.7% of bromine and 0.6% of chlorine, corresponding to a yield of 95.3% of theory (calculated for tetrabromoindigo).

EXAMPLE 4

In a 500-ml stirred reactor 50 g of indigo powder (calculated as 100% pure) are suspended in 350 g of thionyl chloride. Then 107.5 g of chlorine are passed into the reaction mixture at 20°-30° C. over 5 hours and after continued stirring for 1 hour the mixture is stirred into 1.5 kg of ice-water. The suspended dehydrotetrachloroindigo is filtered off and washed neutral with water. The reduction is carried out with 87 g of sodium thiosulfate as described in Example 1. The product obtained is 57.8 g of tetrachloroindigo having a chlorine content of 34.5%, which corresponds to a yield of 75.8% of theory.

We claim:

1. A process for preparing brominated and/or chlorinated indigo comprising reacting indigo with at least one halogen selected from the group consisting of bromine and chlorine, in the presence of a reaction medium and in the presence or absence of iodine wherein thionyl chloride is said reaction medium.

2. A process as claimed in claim 1, wherein indigo and thionyl chloride are used in a weight ratio of from 1:3 to 1:7.

3. A process as claimed in claim 1 or 2, wherein indigo is first reacted with bromine in a molar ratio of from 1:2.2 to 1:2.6 and subsequently reacted with chlorine in a molar ratio of from 1:5.5 to 1:6.5.

4. A process as claimed in claim 1 or 2, wherein the reacting of indigo with said bromine and/or chlorine is carried out at 20°-40° C.

5. A process as claimed in claim 3, wherein the reacting of indigo with bromine is carried out over 2-3 hours and the reacting with chlorine is carried out over 11-13 hours.

6. A process as claimed in claim 1, wherein the reacting is carried out in a paddle dryer.

7. A process as claimed in claim 3, wherein said reacting of indigo with said halogen is carried out at 20°-40° C.

8. A process as claimed in claim 7, wherein said reacting of indigo with bromine is carried out over 2-3 hours and said reacting with chlorine is carried out over 11-13 hours.

9. A process as claimed in claim 1, wherein said reacting is carried out in a rotating tube reactor.

10. A process as claimed in claim 6, further comprising distilling off the thionyl chloride after the reacting.

11. A process as claimed in claim 9, further comprising distilling off the thionyl chloride after the reacting.

12. A process as claimed in claim 3, wherein said reacting of indigo with bromine is carried out over 1-4 hours.

13. A process as claimed in claim 7, wherein said reacting of indigo with bromine is carried out over 1-4 hours.

* * * * *